United States Patent

Higgs et al.

(10) Patent No.: US 8,095,862 B2
(45) Date of Patent: Jan. 10, 2012

(54) END-TO-END CYCLIC REDUNDANCY CHECK PROTECTION FOR HIGH INTEGRITY FIBER TRANSFERS

(75) Inventors: Raymond M. Higgs, Poughkeepsie, NY (US); George P. Kuch, Poughkeepsie, NY (US); Bruce H. Ratcliff, Red Hook, NY (US)

(73) Assignee: International Business Machines Corporation, Armonk, NY (US)

(*) Notice: Subject to any disclaimer, the term of this patent is extended or adjusted under 35 U.S.C. 154(b) by 1126 days.

(21) Appl. No.: 11/870,223

(22) Filed: Oct. 10, 2007

(65) Prior Publication Data

US 2009/0100320 A1 Apr. 16, 2009

(51) Int. Cl.
*G06F 11/00* (2006.01)

(52) U.S. Cl. ............ 714/807; 714/758; 714/48; 714/52; 714/808

(58) Field of Classification Search .................... None
See application file for complete search history.

(56) References Cited

U.S. PATENT DOCUMENTS

| | | | |
|---|---|---|---|
| 5,539,756 A | 7/1996 | Glaise et al. | |
| 6,189,124 B1 | 2/2001 | Glaise | |
| 6,643,818 B1 | 11/2003 | Valk | |
| 6,647,528 B1* | 11/2003 | Collette et al. | 714/758 |
| 6,671,832 B1* | 12/2003 | Apisdorf | 714/52 |
| 7,260,767 B2* | 8/2007 | Bhattacharya et al. | 714/782 |
| 7,310,766 B2* | 12/2007 | Gallagher et al. | 714/776 |
| 2003/0219015 A1* | 11/2003 | Constant Six et al. | 370/389 |
| 2004/0015691 A1* | 1/2004 | Collette et al. | 713/161 |
| 2004/0037234 A1 | 2/2004 | Strawczynski et al. | |
| 2004/0086278 A1 | 5/2004 | Proano et al. | |
| 2004/0210815 A1 | 10/2004 | Ornes et al. | |
| 2006/0090116 A1 | 4/2006 | Gallagher et al. | |
| 2007/0165672 A1* | 7/2007 | Keels et al. | 370/474 |
| 2008/0091857 A1* | 4/2008 | McDaniel | 710/72 |
| 2011/0022935 A1* | 1/2011 | McDaniel | 714/807 |

OTHER PUBLICATIONS

IEEE Transactions on Communications, Jun. 1987, pp. 679-684, vol. Com-35, No. 6,0090-6778/87/0600-0679.
Lucas et al., MESH: Distributed Error Recovery for Multimedia Streams in Wide-Area Multicast Networks, 6 pgs., USA.
Goldstein et al., Adaptive High-Speed CRC Generator/Checker, ip.com Prior Art Database Technical Disclosure, Jan. 1, 1990, pp. 431-434, vol. 32 No. 8B, IBM Corp. Technical Disclosure Bulletin.

* cited by examiner

*Primary Examiner* — John Trimmings
(74) *Attorney, Agent, or Firm* — Jon A. Gibbons; Fleit Gibbons Gutman Bongini & Bianco PL

(57) ABSTRACT

A method, transceiver, and computer program storage product transfer data over fiber between a first transceiver and a second transceiver. The second transceiver is determined to support a high integrity cyclic redundancy check associated with substantially an entire data set in a Fiber Channel Protocol exchange between the first transceiver and the second transceiver. A last data frame in a plurality of data frames is formatted for communication to the second transceiver during the Fiber Channel Protocol exchange. The last data frame includes a plurality of data and at least one cyclic redundancy check field associated with the plurality data and at least one additional cyclic redundancy check field associated with the plurality of data frames.

17 Claims, 6 Drawing Sheets

END-TO-END CYCLIC REDUNDANCY CHECK PROTECTION FOR HIGH INTEGRITY FIBER TRANSFERS

FIELD OF THE INVENTION

The present invention generally relates to the field of databases, and more particularly relates to generating database schemas from a conceptual database model.

BACKGROUND OF THE INVENTION

High-speed networks called Fibre Channel networks are becoming increasingly popular especially for high-speed storage applications. Fibre Channel networks utilize a protocol referred to as Fibre Channel Protocol ("FCP"). FCP is an interface protocol of the Small Computer System Interface ("SCSI"). In the current FCP solutions, FCP frames exchanged between Initiator and Target Devices are only Cyclic Redundancy Check ("CRC") protected on a frame by frame basis. This can cause data integrity issues because the initial data stream can be transferred across many different buses and memory regions prior to being broken down into the individual FCP frames on the specific vendor's FCP adapter.

At any point in the multiple data moves and bus crossings, a data integrity issue is possible since a CRC does not exist that protects the entire data stream. The "changed" bit(s) most likely are never detected since the data is CRC'd after the data error has occurred.

Therefore a need exists to overcome the problems with the prior art as discussed above.

SUMMARY OF THE INVENTION

Briefly, in accordance with various embodiments of the present invention, disclosed are a method, transceiver, and computer program storage product for transferring data over fiber between a first transceiver and a second transceiver. The method includes determining that the second transceiver supports a high integrity cyclic redundancy check associated with substantially an entire data set in a Fibre Channel Protocol exchange between the first transceiver and the second transceiver. A last data frame in a plurality of data frames is formatted for communication to the second transceiver during the Fibre Channel Protocol exchange. The last data frame includes a plurality of data and at least one cyclic redundancy check field associated with the plurality data and at least one additional cyclic redundancy check field associated with the plurality of data frames.

In another embodiment, a transceiver for transferring data over to at least one other transceiver is disclosed. The transceiver includes a processor and a memory that is communicatively coupled to the processor. The transceiver also includes a data transfer manager that is communicatively coupled to the processor and the memory. The data transfer manager is adapted to determine that that the second transceiver supports a high integrity cyclic redundancy check associated with substantially an entire data set in a Fibre Channel Protocol exchange between the first transceiver and the second transceiver. A last data frame in a plurality of data frames is formatted for communication to the second transceiver during the Fibre Channel Protocol exchange. The last data frame includes a plurality of data and at least one cyclic redundancy check field associated with the plurality data and at least one additional cyclic redundancy check field associated with the plurality of data frames.

In yet another embodiment, a computer program storage product for transferring data over fiber between a first transceiver and a second transceiver is disclosed. The computer program storage product includes instructions for determining that the second transceiver supports a high integrity cyclic redundancy check associated with substantially an entire data set in a Fibre Channel Protocol exchange between the first transceiver and the second transceiver. A last data frame in a plurality of data frames is formatted for communication to the second transceiver during the Fibre Channel Protocol exchange. The last data frame includes a plurality of data and at least one cyclic redundancy check field associated with the plurality data and at least one additional cyclic redundancy check field associated with the plurality of data frames.

One advantage of the foregoing embodiments of the present invention is that a data transfer system within a Fibre Channel network provides a CRC that protects an entire data stream in an FCP exchange. The embedded CRC, in one embodiment, is imbedded after the last byte of data in the data stream. Another advantage of the foregoing embodiments of present invention is that this additional CRC is protected by the CRC generated by an FCP Adapter for the last data frame in the data stream, which comprises the additional CRC. A simple extension to the current Process Login ("PRLI") Extended Link Service ("ELS") exchange is the only change required in the FCP Architecture to exchange the capabilities of both the Target and Initiator to support the new CRC field. Since the PRLI ELS exchange is already part of the FCP Architecture, new overhead or special commands are not required by the foregoing embodiments of the present invention.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the various embodiments of the present invention.

DETAILED DESCRIPTION

Various embodiments of the present invention can be produced in hardware or software, or in a combination of hardware and software. However, in one embodiment, the invention is implemented in software. The system, or method, according to the inventive principles as disclosed in connection with various embodiments, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with various embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Computing Environment

Figure 1:
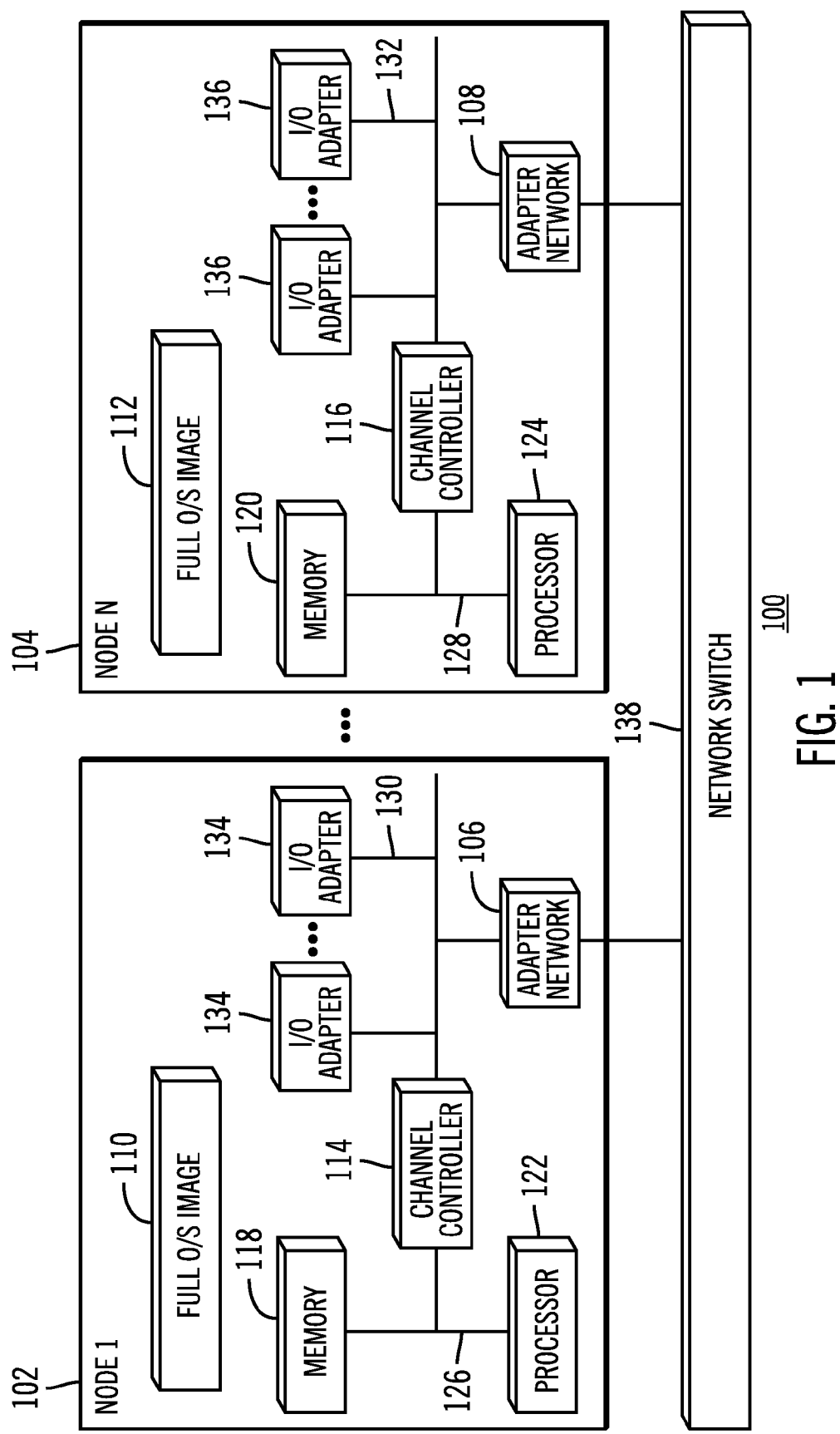
FIG. 1 is a block diagram illustrating a computing environment, according to one embodiment of the present invention.

FIG. 1 is a block diagram illustrating a computing environment according to one embodiment of the present invention. In one embodiment, the computing environment 100 of FIG. 1 is used for transferring data over a Fibre Channel network. It should be noted that the various embodiments of the present invention can be scaled across multiple processing nodes such as in the computing environment of FIG. 1 or can reside at a single node.

In the illustrated embodiment, the computing environment 100 is a distributed system in a symmetric multiprocessing ("SMP") computing environment. The computing environment 100 includes processing nodes 102, 104 coupled to one another via network adapters 106 and 108. Each processing node 102, 104 is an independent computer with its own operating system image 110, 112; channel controller 114, 116; memory 118, 120; and processor(s) 122, 124 on a system memory bus 126, 128. A system input/output bus 130, 132 couples I/O adapters 134, 136 and network adapter 106, 108. Although only one processor 122, 124 is shown in each processing node 102, 104, each processing node 102, 104 is capable of having more than one processor. Each network adapter is linked together via a network switch 138. In some embodiments, the various processing nodes 102, 104 are part of a processing cluster.

Information Processing System

Figure 2:
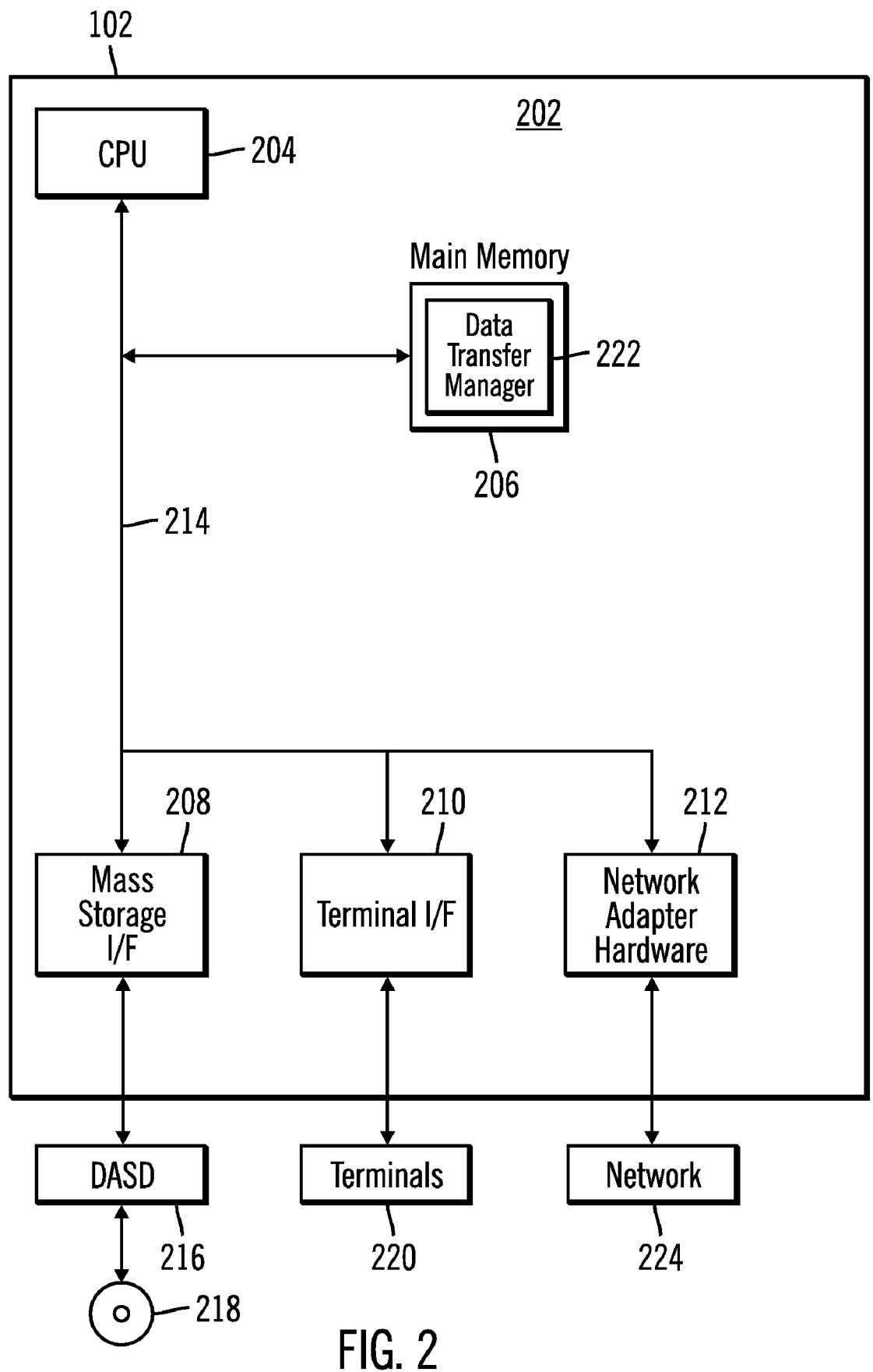
FIG. 2 is a block diagram illustrating and an information processing system environment according to one embodiment of the present invention.

FIG. 2 is a block diagram illustrating a more detailed view of an information processing system 102 according to one embodiment of the present invention. The information processing system is based upon a suitably configured processing system adapted to implement at least one embodiment of the present invention. Any suitably configured processing system is similarly able to be used as the information processing system 102 by some embodiments of the present invention such as an information processing system residing in the computing environment of FIG. 1, a personal computer, workstation, or the like.

The information processing system 102 includes a computer 202. The computer 202 has a processor 204 that is connected to a main memory 206, mass storage interface 208, terminal interface 210, and network adapter hardware 212. A system bus 214 interconnects these system components. The mass storage interface 208 is used to connect mass storage devices, such as data storage device 216, to the information processing system 102 system. One specific type of data storage device is a computer readable medium such as a floppy disk drive, which may be used to store data to and read data from a CD 218 or a floppy diskette (not shown). Another type of data storage device is a data storage device configured to support, for example, NTFS type file system operations.

The main memory 206, in one embodiment, comprises a data transfer manager 222 that manages data transfers during an FCP session. In one embodiment, the data transfer manager 222 determines if a FCP initiator device and/or an FCP target device are high integrity mode capable, as discussed in greater detail below. High integrity mode refers to the ability to support an additional CRC that encompasses all data frames within an FCP exchange. Although illustrated as concurrently resident in the main memory 206, it is clear that respective components of the main memory 206 are not required to be completely resident in the main memory 206 at all times or even at the same time. In one embodiment, the information processing system 102 utilizes conventional virtual addressing mechanisms to allow programs to behave as if they have access to a large, single storage entity, referred to herein as a computer system memory, instead of access to multiple, smaller storage entities such as the main memory 206 and data storage device 216. Note that the term "computer system memory" is used herein to generically refer to the entire virtual memory of the information processing system 102.

Although only one CPU 204 is illustrated for computer 202, computer systems with multiple CPUs can be used equally effectively. Embodiments of the present invention further incorporate interfaces that each includes separate, fully programmed microprocessors that are used to off-load processing from the CPU 204. Terminal interface 210 is used to directly connect one or more terminals 220 to computer 202 to provide a user interface to the computer 202. These terminals 220, which are able to be non-intelligent or fully programmable workstations, are used to allow system administrators and users to communicate with the information processing system 102. The terminal 220 is also able to consist of user interface and peripheral devices that are connected to computer 202 and controlled by terminal interface hardware included in the terminal I/F 210 that includes video adapters and interfaces for keyboards, pointing devices, and other devices/interfaces.

An operating system (not shown) included in the main memory is a suitable multitasking operating system such as the Linux, UNIX, Windows XP, and Windows Server 2001 operating system. Various embodiments of the present invention are able to use any other suitable operating system. Some embodiments of the present invention utilize architectures, such as an object oriented framework mechanism, that allows instructions of the components of operating system (not shown) to be executed on any processor located within the information processing system 102. The network adapter hardware 212 is used to provide an interface to a network 224. Some embodiments of the present invention are able to be adapted to work with any data communications connections including present day analog and/or digital techniques or via a future networking mechanism.

Although the some embodiments of the present invention are described in the context of a fully functional computer system, those skilled in the art will appreciate that embodiments are capable of being distributed as a program product via CD or DVD, e.g. CD 218, CD ROM, or other form of recordable media, or via any type of electronic transmission mechanism.

Network for FCP Exchanges

Figure 3:
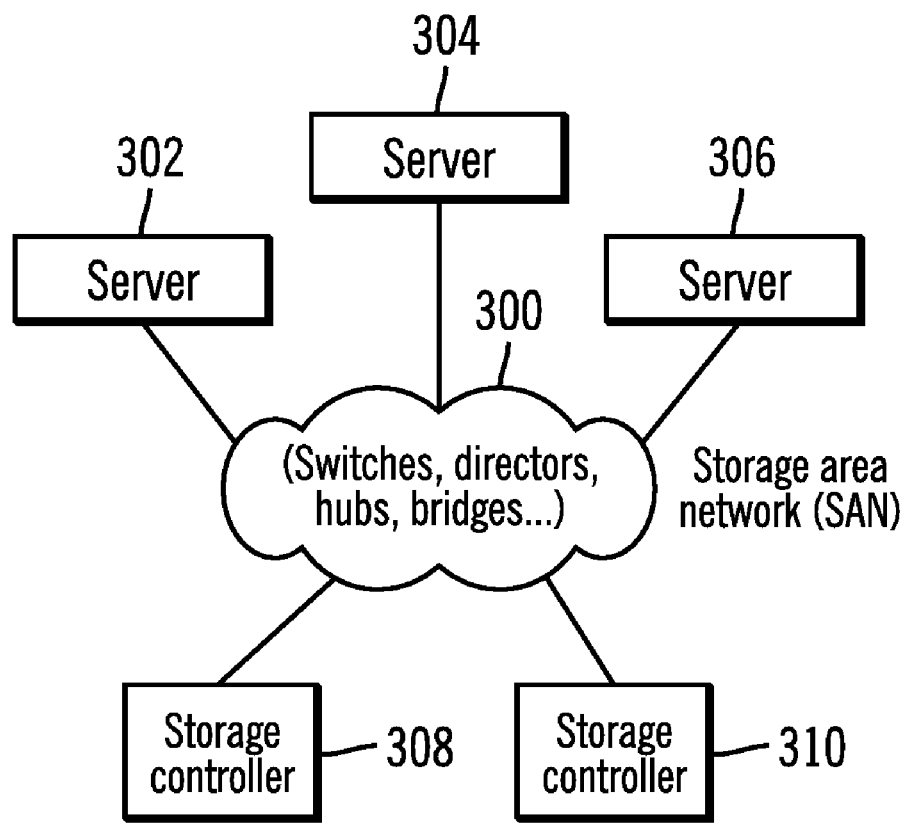
FIG. 3 is a block diagram illustrating one example of a network that implements FCP according to one embodiment of the present invention.

FIG. 3 is a block diagram illustrating one example of a network that implements FCP. FCP and its applications are discussed in greater detail in "FCP for the IBM eServer zSeries systems: Access to distributed storage", I. Adlung, G. Banzhaf, W. Eckert, G. Kuch, S. Mueller, C. Raisch, IBM J. Res. & Dev. Col. 46 No. 4/5 July/September 2002, which is hereby incorporated by reference in its entirety. In particular, FIG. 3 shows a Fibre Channel-based storage area network ("SAN") 300. The SAN 300 is communicatively coupled to one or more servers 302, 304, 306 and one or more storage controllers 308, 310. The SAN 300 provides access to a large storage pool used to satisfy the storage needs of the connected servers 302, 302, 304. The SAN 300 can be independently managed and serviced, freeing the servers from these chores.

Fibre Channel networks such as the SAN 300 shown in FIG. 3 comprise of servers, storage units (controllers and devices), and interconnects (directors or switches) that enable any-to-any connectivity between the servers and the storage units. The interconnect as well as the communication between the servers and storage units is defined by the suite of Fibre Channel standards. The Fibre Channel architecture is a multilayer architecture consisting of five layers, FC-0 through FC-4. FC-0 describes the physical characteristics of a Fibre Channel network, such as the cables and connectors. Different optical and physical interfaces are defined. FC-1 defines the transmission protocol, and FC-2 the signaling protocol. The FC-3 layer defines common services. Above these four layers, there are various FC-4 protocols, including HIPPI, IPI3, SB-2, and SCSI.

In a Fibre Channel fabric, nodes are connected by physical point-to-point links, starting and ending at a port. Only in a point-to-point topology are both of these ports tied to end nodes. More often, one port is associated with an end node while the other one belongs to a Fibre Channel switch. Also, in the case of cascaded switches, both ports may be switch ports. The Fibre Channel architecture defines three distinct topologies as interconnects between Fibre Channel end nodes. The simplest topology is a direct "point-to-point" connection, typically between a host and an endpoint device such as a disk controller. After a connection has been established between these two nodes, the full bandwidth is available between the host and the device.

The term "arbitrated loop" defines a ring topology in which up to 127 nodes, both hosts and endpoint devices, share the Fibre Channel bandwidth. Arbitrated loops are often implemented using hub devices, where the loop is basically implemented within the hub while the end devices are connected to the hub. Hubs can also be cascaded to build more complex configurations. "Switched fabrics" are implemented as switched connections between hosts and devices. One or more switches or directors are used to interconnect the end nodes in such a Fibre Channel network. Directors represent very reliable high-end switches without single points of failure. For simplicity, the term "switch" is used to refer to both Fibre Channel switches and directors in this paper. All connections in a switched fabric provide the full Fibre Channel bandwidth to each port. In addition to these three Fibre Channel topologies, Fibre-Channel-to-SCSI bridges can be used to attach parallel SCSI devices. Switches, hubs, and Fibre-Channel-to-SCSI bridges can all coexist in the same Fibre Channel network, and they are the building blocks for constructing large storage area networks.

High Integrity Operation (End-to-End CRC Protection)

As discussed above, FCP data transfer integrity is protected on a per frame basis as specified in the T10 architecture standard FC-FS-2, which his hereby incorporated by reference in its entirety. The protection is done via a CRC, which encompasses each data frame of the exchange. The problem is that this CRC is generated after the associated data has been handled by commodity firmware, and hardware from an outside vendor. The initial data stream can be transferred across many different buses and memory regions prior to being broken down into the individual FCP frames. At any point in the multiple data moves and bus crossings, a data integrity issue is possible since conventional systems do not provide a CRC that protects the entire data stream. The corrupted bit(s) are not detected since the data is CRC'd after the data error occurs.

Various embodiments of the present invention, on the other hand, provide a high integrity operation for FCP initiator devices and FCP target devices. This high integrity operation mode embeds an additional CRC, which encompasses the data included in all the data frames of the data transfer (FCP exchange). This new CRC can be generated by trusted hardware, which is heavily checked. Thus the integrity of the data, and CRC is very high. This data and CRC can then flow through multiple layers of weakly checked hardware, and then be checked by the high integrity hardware at the target before being used. The various embodiments of the present invention is advantageous because if a data corruption occurs in a data frame prior to that frame being CRC'd, the new CRC of the various embodiments of the present invention indicates that an error has occurred.

In one embodiment, the data transfer manager 222 determines if both the FCP initiator and the FCP target(s) support the additional CRC. An FCP initiator is a device that starts an FCP session with another FCP device referred to as the FCP target. The FCP initiator transfers data to the FCP target, which receives the transferred data. In one embodiment, the data transfer manager 222 can determine if both the FCP initiator and FCP target are capable of supporting the additional CRC via the Process Login ("PRLI") Extended Link Service ("ELS") exchange.

Figure 4:
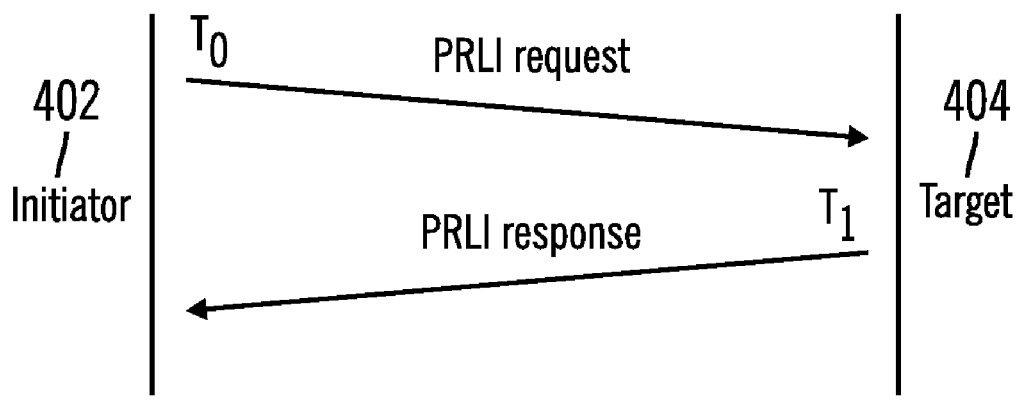
FIG. 4 is a timing diagram showing transactions between FCP initiator and target devices for determining high integrity mode capabilities according to one embodiment of the present invention.

In an FCP environment, this exchange is performed prior to any data transfer. FIG. 4 shows an example of a PRLI exchange between the FCP initiator 402 and the FCP target 404. The data transfer manager 222 at the FCP initiator can select a reserved, obsolete, or heretofore undefined bit in the request frame, which is sent from the FCP initiator 402 to the target 404, at time $T_0$. The bit being set indicates that the FCP initiator 402 is capable of supporting the high integrity mode of operation, i.e. the additional CRC of the various embodiments of the present invention. The FCP target 404 can indicate its ability to support this mode by setting an appropriate bit in the PRLI accept frame, at time $T_1$. If both bits are set, the data transfer manager 222 at each of the FCP initiator 402 and the FCP target 404 enable the high integrity mode of the device for using the additional CRC. If either bit is not set, the initiator/target pair implement all data transfers in the currently architected mode.

Therefore, the various embodiments of the present invention are backward compatible with current systems that do not include the capability for high integrity operation. For example, if the FCP initiator determines that the target is not high integrity capable, the FCP initiator can use conventional FCP methods. The high integrity mode of operation of the various embodiments of the present invention has no impact on the current structure of the FCP Command Descriptor Block. The Logical Block Count and FCP Data Length fields are not affected.

Figure 5:
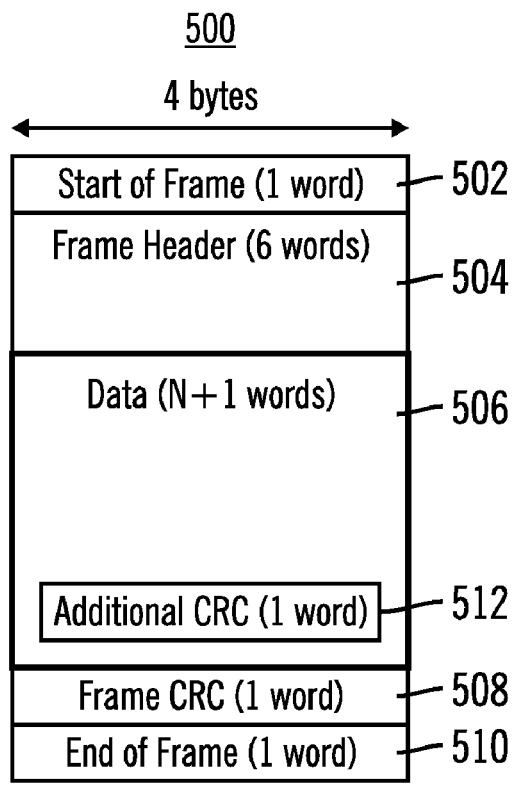
FIG. 5 is a block diagram illustrating one example of a data frame comprising an additional CRC according to one embodiment of the present invention.

FIG. 5 shows one example of how the additional CRC can be implemented within a data frame 500. FIG. 5 shows a data frame 500 comprising a start portion 502, a header portion 504, data 506, a frame CRC 508, and an end of frame portion 510. When the data transfer manager 222 determines that both the FCP initiator and the FCP target are high integrity mode capable, an additional CRC 512 is embedded within the frame 500 that is associated with all data frames in an FCP exchange. In one embodiment, the additional CRC 512 is embedded within the last data frame. The additional CRC of the various embodiments of the present invention is associated with and protects all data in all the data frames of the FCP exchange. Stated differently, the additional CRC 512 protects that data in Data Frame 0 to Data Frame N, where Data Frame N is the last data frame in the FCP exchange.

Figure 6:
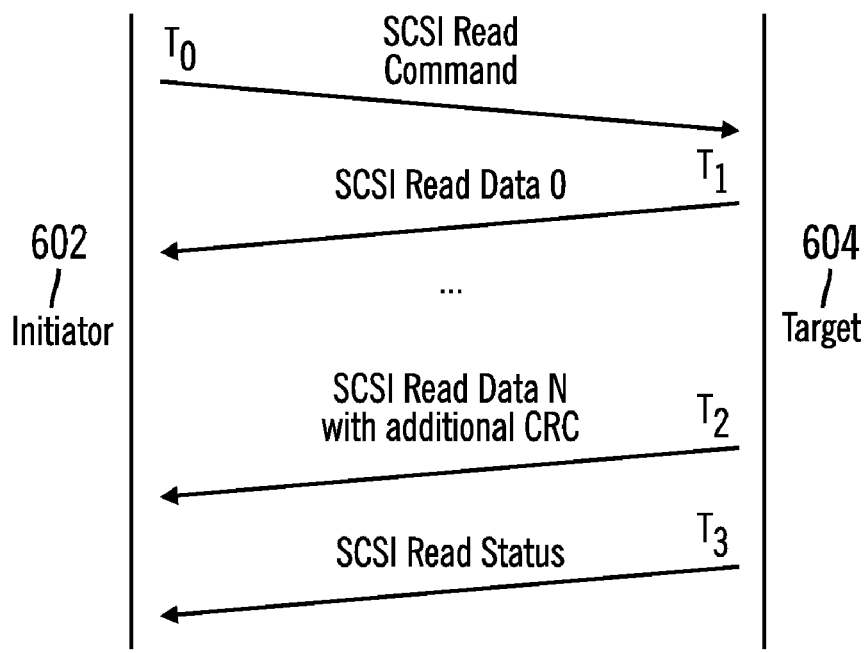
FIG. 6 is a timing diagram illustrating a SCSI Read exchange between a FCP initiator and a FCP target according to one embodiment of the present invention.

FIG. 6 is a timing diagram illustrating a SCSI Read exchange between a FCP initiator 602 and a FCP target 604 according to one embodiment of the present invention. In one embodiment, the FCP initiator 602 is a host that has logged into an FC switch. The FCP initiator 602 identifies FCP targets and establishes an FC connection with FC devices comprising a target. The FCP initiator can then establish an FC session with each of the targets. A PRLI exchange occurs between the FCP initiator 602 and the FCP target 604 as discussed above to determine if the high integrity mode is to be used. The example of FIG. 6 assumes that both the FCP initiator 602 and the FCP target are high integrity mode capable.

At time T0, the FCP initiator 602 sends a SCSI Read command to the FCP target 604. At time T1, the FCP target 604 performs the SCSI Read action, accumulates CRC for the first data frame, Data Frame 0, of the FCP exchange, and then sends Data Frame 0. CRC continues to be accumulated for the data portion of all intermediate frames. This process continues until the FCP targets 604 sends the last Data Frame N, at time T2. The FCP target 604 then sends SCSI status at time T3. As the data transfer manager 222 receives each data frame, it accumulates CRC. The data transfer manager 222 determines that the last Data Frame N comprises an additional CRC for high integrity mode. The additional CRC field is compared to the accumulated CRC to determine if any of the data is corrupt.

As discussed above, the high integrity mode operation has no impact on the current structure of the FCP Command Descriptor Block. The Logical Block Count and FCP Data Length fields are not affected. The device drivers in both the initiator and target are aware that high integrity mode is active and must account for the transmission/reception of the additional 4 byte CRC. The CRC which protects the data transmitted in the individual data frames is appended to the last data frame of the last sequence of the exchange. It is the responsibility of upper level of strongly checked hardware to check the data and CRC to validate the transfer was not corrupted.

As can be seen from the above discussion, the various embodiments of the present invention provide a high integrity operation for FCP devices that embeds an additional CRC encompassing all the data frames of in a FCP exchange. Thus the integrity of the data, and CRC is very high. The various embodiments of the present invention are advantageous because if a data occurs in a data frame prior to that frame being CRC'd, the new CRC of the various embodiments of the present invention indicates that an error has occurred.

High Integrity Mode Detection

Figure 7:
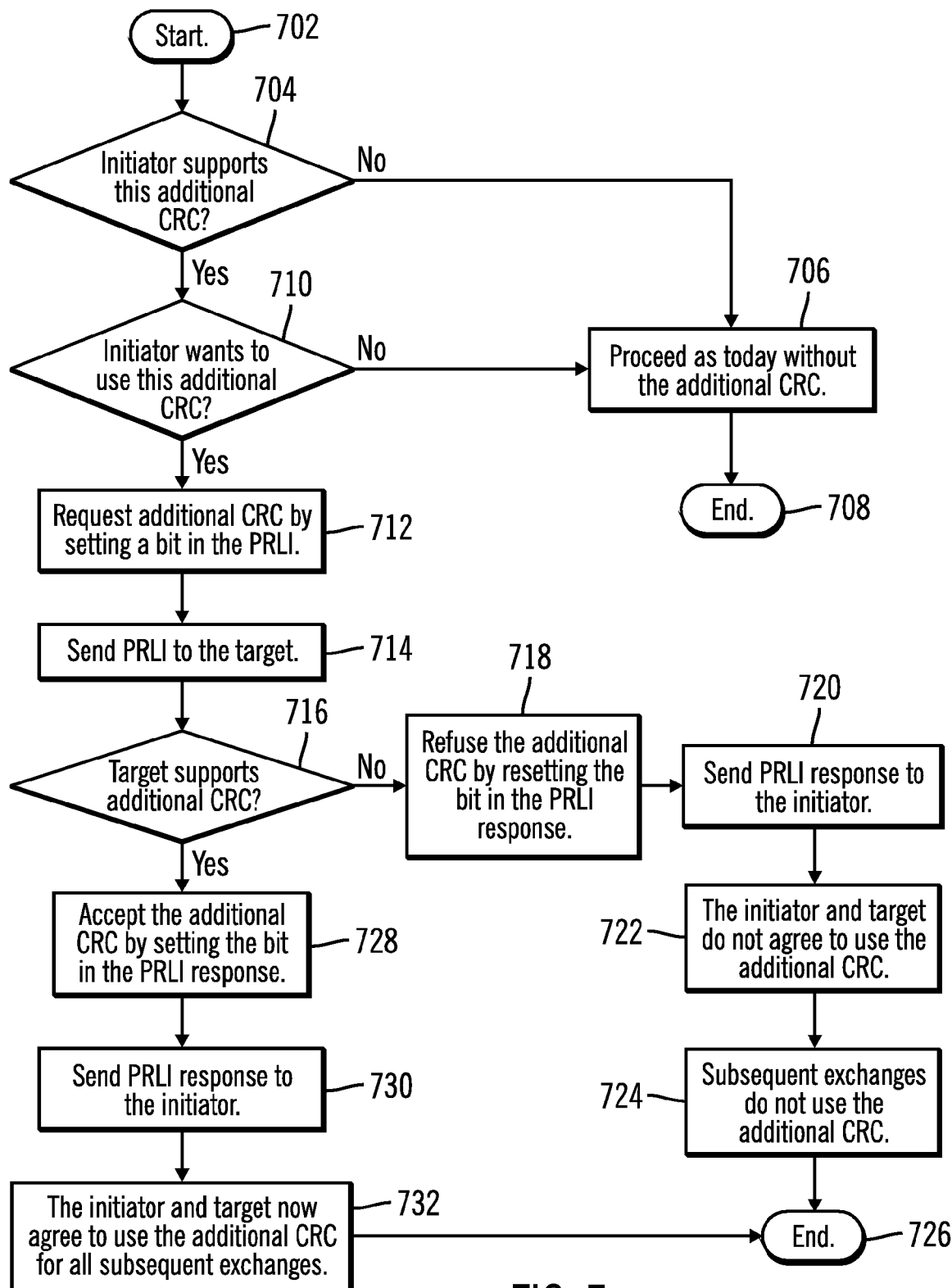
FIG. 7 is an operational flow diagram illustrating a process of detecting high integrity mode capabilities in FCP initiator and target devices according to one embodiment of the present invention.

FIG. 7 is an operational flow diagram illustrating one example of detecting if a FCP initiator and/or a FCP target is high integrity mode capable. The operational flow diagram of FIG. 7 begins at step 702 and flows directly to step 704. The data transfer manager 222, at step 704, determines if the initiator supports a high integrity mode CRC. This process has been discussed above in more detail. If the result of this determination is negative, the FCP exchange proceeds using conventional FCP methods without the high integrity mode CRC. The control flow exits at step 708.

If the result of this determination is positive, the data transfer manager 222, at step 710, determines if the FCP initiator wants to use the high integrity mode CRC. If the result of this determination is negative, the control flows to step 706. If the result of this determination is positive, the data transfer manager 222 at the FCP initiator requests the high integrity mode by setting a bit in the PRLI, at step 712. The FCP initiator, at step 714, sends the PRLI to the FCP target. The data transfer manager 222 at the FCP target determines if the FCP target is high integrity mode capable, at step 716. If the result of this determination is negative, the FCP target, at step 718, refuses the additional CRC of the high integrity mode by resetting the bit in the PRLI response.

The FCP target, at step 720, sends the PRLI response to the FCP initiator. The FCP initiator and the FCP target, at step 722, agree to not use the high integrity mode. Subsequent FCP exchanges, at step 724, use conventional FCP methods. The control flow exits at step 726. Returning to step 710, if the result of this determination is positive, the FCP target, at step 728, accepts the use of an additional CRC bit by setting the bit in the PRLI response. The FCP target, at step 730, sends the PRLI response to the FCP initiator. The FCP initiator and the FCP target, at step 732, agree use the high integrity mode for subsequent FCP exchanges. The control flow exits at step 726.

High Integrity Mode

Figure 8:
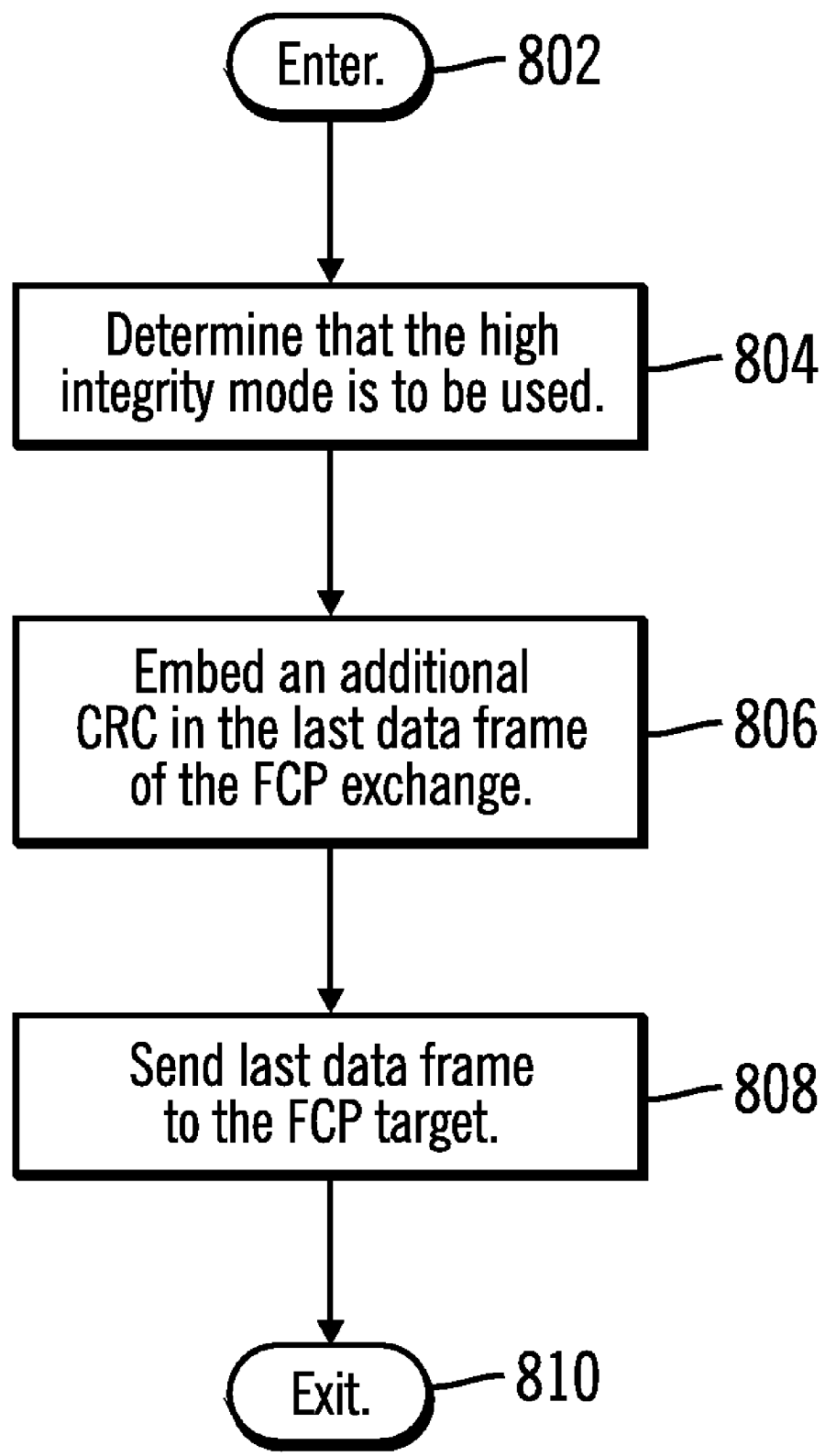
FIG. 8 is an operational flow diagram illustrating a process performing high integrity mode operation according to one embodiment of the present invention.

FIG. 8 is an operational flow diagram illustrating one example of a FCP initiator device operating in a high integrity mode. The operational flow diagram of FIG. 8 begins at step 802 and flows directly to step 804. The data transfer manager 222 of the FCP initiator device, at step 804, determines that the high integrity mode is to be used, as discussed above. The data transfer manager 222, at step 806, embeds a CRC in the last data frame of the FCP exchange to protect all the data in the FCP exchange. The last data frame, at step 808, is sent to the FCP initiator that analyzes the additional CRC to determine if the data in the FCP exchange has been corrupted. The control flow exits at step 810.

Non-Limiting Examples

Some embodiments of the present invention can be realized in hardware, software, or a combination of hardware and software. A system according to various embodiments of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for transferring data over fiber between a first transceiver and a second transceiver, the method on the first transceiver comprising:
    determining that the second transceiver supports a high integrity cyclic redundancy check associated with substantially an entire data set in a Fibre Channel Protocol exchange session between the first transceiver and the second transceiver, wherein one of the first transceiver and the second transceiver is an initiator of the Fibre Channel Protocol exchange session and the other of the first transceiver and the second transceiver is a target of the Fibre Channel Protocol exchange session; and
    formatting a last data frame in a plurality of data frames for communication to the second transceiver during the Fibre Channel Protocol exchange session, the plurality of data frames comprising all data to be transferred during the Fibre Channel Protocol exchange session, wherein the last data frame includes a plurality of data and at least one cyclic redundancy check field associated with the plurality of data and at least one additional cyclic redundancy check field associated with the plurality of data frames, wherein the at least one additional cyclic redundancy check field comprises a cyclic redundancy check value that protects all data within the plurality of data frames.

2. The method of claim 1, wherein the determining further comprises:
    formatting a Process Login message to indicate a high integrity mode is requested; and
    transmitting the Process Login message to the second transceiver.

3. The method of claim 2, further comprising:
    receiving a Process Login response from the second transceiver; and
    determining, in response information included with the Process Login that has been received, whether the second transceiver supports the high integrity mode, and
    wherein if the second transceiver fails to support the high integrity mode,
    transferring data to the second transceiver using traditional Fibre Channel Protocol methods.

4. The method of claim 2, wherein the formatting comprises:
    setting at least one bit in the Process Login message for indicating that the first transceiver requests to transfer data using the high integrity mode.

5. The method of claim 2, wherein the determining whether the second transceiver supports the high integrity mode further comprises:
    identifying at least one bit within the Process Login response that indicates the second transceiver supports the high integrity mode.

6. The method of claim 2, wherein the formatting comprises:
    associating at least one new frame to the Process Login message for indicating that the first transceiver requests to transfer data using the high integrity mode.

7. A transceiver for transferring data over to at least one other transceiver, the transceiver comprising:
    a processor;
    a memory communicatively coupled to the processor; and
    a data transfer manager communicatively coupled to the processor and the memory, wherein the data transfer manager is configured to:
        determine that the at least one other transceiver supports a high integrity cyclic redundancy check associated with substantially an entire data set in a Fibre Channel Protocol exchange session between the transceiver and the other transceiver, wherein one of the transceiver and the other transceiver is an initiator of the Fibre Channel Protocol exchange session and the other of the first transceiver and the other transceiver is a target of the Fibre Channel Protocol exchange session; and
        format a last data frame in a plurality of data frames for communication to the other transceiver during the Fibre Channel Protocol exchange session, the plurality of data frames comprising all data to be transferred during the Fibre Channel Protocol exchange session, wherein the last data frame includes a plurality of data and at least one cyclic redundancy check field associated with the plurality of data and at least one additional cyclic redundancy check field associated with the plurality of data frames, wherein the at least one additional cyclic redundancy check field comprises a cyclic redundancy check value that protects all data within the plurality of data frames.

8. The transceiver of claim 7, wherein the data transfer manager is further adapted to determine by:

formatting a Process Login message to indicate a high integrity mode is requested; and transmitting the Process Login message to the other transceiver.

9. The transceiver of claim 8, wherein the data transfer manager is further adapted to:

receive a Process Login response from the other transceiver; and determine, in response information included with the Process Login that has been received, whether the other transceiver supports the high integrity mode, and wherein if the other transceiver fails to support the high integrity mode, transfer data to the other transceiver using traditional Fibre Channel Protocol methods.

10. The transceiver of claim 8, wherein data transfer manager is further adapted to format by at least one of:

setting at least one bit in the Process Login message for indicating that the transceiver requests to transfer data using the high integrity mode; and associating at least one new frame to the Process Login message for indicating that the transceiver requests to transfer data using the high integrity mode.

11. The transceiver of claim 8, wherein the data transfer manager is further adapted to determine whether the other transceiver supports the high integrity mode by:

identifying at least one bit within the Process Login response that indicates the other transceiver supports the high integrity mode.

12. A computer program storage product for transferring data over fiber between a first transceiver and a second transceiver, the computer program storage product comprising instructions for:

determining that the second transceiver supports a high integrity cyclic redundancy check associated with substantially an entire data set in a Fibre Channel Protocol exchange session between the first transceiver and the second transceiver, wherein one of the first transceiver and the second transceiver is an initiator of the Fibre Channel Protocol exchange session and the other of the first transceiver and the second transceiver is a target of the Fibre Channel Protocol exchange session; and formatting a last data frame in a plurality of data frames for communication to the second transceiver during the Fibre Channel Protocol exchange session, the plurality of data frames comprising all data to be transferred during the Fibre Channel Protocol exchange session, wherein the last data frame includes a plurality of data and at least one cyclic redundancy check field associated with the plurality of data and at least one additional cyclic redundancy check field associated with the plurality of data frames, wherein the at least one additional cyclic redundancy check field comprises a cyclic redundancy check value that protects all data within the plurality of data frames.

13. The computer program storage product of claim 12, wherein the instructions for determining further comprise instructions for:

formatting a Process Login message to indicate a high integrity mode is requested; and transmitting the Process Login message to the second transceiver.

14. The computer program storage product of claim 13, further comprising instructions for:

receiving a Process Login response from the second transceiver; and determining, in response information included with the Process Login that has been received, whether the second transceiver supports the high integrity mode, and wherein if the second transceiver fails to support the high integrity mode, transferring data to the second transceiver using traditional Fibre Channel Protocol methods.

15. The computer program storage product of claim 13, wherein the instructions for formatting further comprise instructions for:

setting at least one bit in the Process Login message for indicating that the first transceiver requests to transfer data using the high integrity mode.

16. The computer program storage product of claim 13, wherein the instructions for determining whether the second transceiver supports the high integrity mode further comprise instructions for:

identifying at least one bit within the Process Login response that indicates the second transceiver supports the high integrity mode.

17. The computer program storage product of claim 13, wherein the instructions for formatting further comprise instructions for:

associating at least one new frame to the Process Login message for indicating that the first transceiver requests to transfer data using the high integrity mode.

* * * * *